United States Patent
Crilly, Jr. et al.

(10) Patent No.: US 8,081,945 B2
(45) Date of Patent: Dec. 20, 2011

(54) FEEDBACK CANCELLATION SYSTEM AND METHOD

(75) Inventors: William J. Crilly, Jr., Dunbarton, NH (US); Xiaoqing Xia, Manchester, NH (US)

(73) Assignee: Cellular Specialities, Inc., Manchester, NH (US)

( * ) Notice: Subject to any disclaimer, the term of this patent is extended or adjusted under 35 U.S.C. 154(b) by 504 days.

(21) Appl. No.: 12/328,249

(22) Filed: Dec. 4, 2008

(65) Prior Publication Data

US 2009/0197541 A1    Aug. 6, 2009

Related U.S. Application Data

(60) Provisional application No. 60/992,146, filed on Dec. 4, 2007, provisional application No. 61/073,422, filed on Jun. 18, 2008, provisional application No. 61/074,282, filed on Jun. 20, 2008.

(51) Int. Cl.
     *H04B 1/06*      (2006.01)
     *H04B 7/00*      (2006.01)

(52) U.S. Cl. ............... 455/278.1; 455/11.1; 455/63.1; 455/296

(58) Field of Classification Search .......... 455/11.1, 455/24, 69, 63.1, 296, 278.1
See application file for complete search history.

(56) References Cited

U.S. PATENT DOCUMENTS

| | | | |
|---|---|---|---|
| 5,835,848 A * | 11/1998 | Bi et al. | 455/24 |
| 6,385,435 B1 * | 5/2002 | Lee | 455/24 |
| 6,745,003 B1 | 6/2004 | Maca et al. | |
| 7,035,587 B1 * | 4/2006 | Yarkosky | 455/13.4 |
| 7,058,368 B2 * | 6/2006 | Nicholls et al. | 455/114.2 |
| 7,596,352 B2 * | 9/2009 | Ding et al. | 455/11.1 |
| 2002/0181699 A1 | 12/2002 | Pham et al. | |
| 2003/0022626 A1 * | 1/2003 | Miquel et al. | 455/24 |
| 2005/0215193 A1 | 9/2005 | Kummetz | |
| 2011/0002367 A1 | 1/2011 | Kummetz | |

OTHER PUBLICATIONS

R .Neil Braithwaite,—"Estimation and Compensation of Radiated Feedback Coupling in a High Gain Repeater Using Gain Dithering"—pp. 197-200, Proceedings of the $10^{th}$ European Conference on Wireless Technology, 2007, Munich Germany.

Christopher R. Anderson, et al.,—"Antenna Isolation, Wideband Multipath Propagation Measurements, and Interference Mitigation for On-frequency Repeaters"—pp. 3-7, IEEE proceedings, 2004.

Heungjae Choi, et al,—"Digital Controlled Co-channel Feedback Interference Cancellation System with Broadband Cancellation"—pp. 194-197, Proceedings of the $1^{st}$ European Wireless Technology Conference, Oct. 2008, Amsterdam, The Netherlands.

\* cited by examiner

*Primary Examiner* — Quan Tra
(74) *Attorney, Agent, or Firm* — Bourque and Associates, PA

(57) ABSTRACT

A system and method for detecting antenna coupling and for providing feedback cancellation in response to the antenna coupling includes a signal feedback cancellation circuit configured to be coupled between a signal receiver and a signal transmitter. The feedback cancellation circuit is responsive to received signals, amplified signals and the detection of signal coupling between a receiving antenna any transmitting antenna, for providing a feedback cancellation signal to a signal amplifier. The feedback cancellation circuit may employ time domain or frequency domain methods. In the case of a time domain method, the feedback cancellation circuit may further include a White noise generator which serves to the tune or adjust the feedback cancellation circuit.

6 Claims, 6 Drawing Sheets

FEEDBACK CANCELLATION SYSTEM AND METHOD

CROSS-REFERENCE TO RELATED APPLICATIONS

This application claims priority to U.S. Patent Application Nos. 60/992,146 filed on Dec. 4, 2007 entitled "Frequency Domain Feedback Cancellation; 61/073,422 filed on Jun. 18, 2008 entitled "Frequency Domain Feedback Cancellation"; and 61/074,282 filed on Jun. 20, 2008 entitled "Frequency Domain Feedback Cancellation" all of which are incorporated fully herein by reference.

FIELD OF THE INVENTION

The present invention relates to signal repeaters such as used for cell phone signals and more particularly, to a system and method using either time domain or frequency domain feedback cancellation to eliminate or at least greatly reduce signal coupling that may occur between the input and output antennas of a signal system.

BACKGROUND

There are a number of situations in which it is desirable or even necessary to provide a high gain signal repeater. For example, it is now well known that the cell phone signals are weak or nonexistent in a building or other structure such as a large sports stadium which structures are partially or completely enclosed using materials such as steel, aluminum and concrete. In these situations, it is desirable to provide a signal repeater that is designed to receive incoming cell phone signals from a cell phone power, broadcast the signals within the structure and also received outgoing cell phone signals from within the structure to be broadcast back to the cell phone tower.

A problem exists when such a high gain repeater is deployed in a way that coupling can occur between the input and output antennas of such systems. A typical repeater gain may be 85 dB, with antennas separated by a distance of only meters to tens of meters in difficult deployment situations. When two antennas of a bi-directional amplifier (BDA) are so close together, unwanted signal coupling is stronger, and this will cause the amplified signal to be distorted and will potentially cause the BDA to oscillate. The propagation of signals with multipath, usually present, causes a situation where overall gain is equal to or greater than 0 DB, and a phase shift is 0° at a frequency. Under these conditions, an oscillation can occur.

For example, in an in-building deployment, a repeater or antenna may be placed on a roof immediately above a server antenna. If the penetration loss through the roof is not accounted for, a higher than zero DB overall gain is possible and oscillation will likely occur.

Various methods have been used in the past to reduce coupling. These include methods using antenna lobe suppression, shielding material, absorbing foam and cancellation methods. Cancellation methods, especially those using digital techniques, are generally preferred as they involve less in terms of special deployment techniques. One cancellation method that has been used is the Least Mean Square or normalized Least Mean Square method. This technique uses a digital correlator to determine the propagation coupling between the input and output antenna, and an accumulator in a feedback loop to set coefficients in a cancellation filter.

A repeater has unique problems in the presence of strong variable signals, particularly on the uplink. Uplink signals are generated typically by hand sets. When the composite uplink signal is a result of a small number of hand sets, the power can fluctuate a great deal. This is due to the burst nature of most communication protocols, particularly those in TCP/IP based systems. The burst nature of the signals has been known to produce a lack of coverage in LMS and normalized LMS systems, and prevents their use as a good solution to uplink cancellation suppression.

Accordingly, what is needed is an easy to implement and reliable system and method designed to incorporate feedback cancellation in a bidirectional amplifier where there is signal coupling between the input and the output antenna, in order to prevent the bidirectional amplifier from oscillating and to reduce the distortion and modulation errors in the amplified signals caused by regenerative gain unflatness.

SUMMARY OF THE INVENTION

The solution provided by the invention is one which performs spectral analysis on the output and feed back composite signals, and uses algorithms to update the coefficients of a frequency domain based feedback estimation filter. Correlating of input signal and the added white noise is used to capture the coefficients of this filter and gain scaling is applied to prevent high level signals from causing instability in the feedback cancellation system. Depending on the design of the propagation estimation filter, a conversion to the time domain based may be used to determine the propagation estimation filter (FIR) coefficients or frequency domain coefficients may be used directly with a frequency domain filter. Additional details and description of the invention are provided in the attached pages 4 to 21.

BRIEF DESCRIPTION OF THE DRAWINGS

These and other features and advantages of the present invention will be better understood by reading the following detailed description, taken as a together with the drawings wherein.

DETAILED DESCRIPTION OF THE PREFERRED EMBODIMENTS

Figure 1:
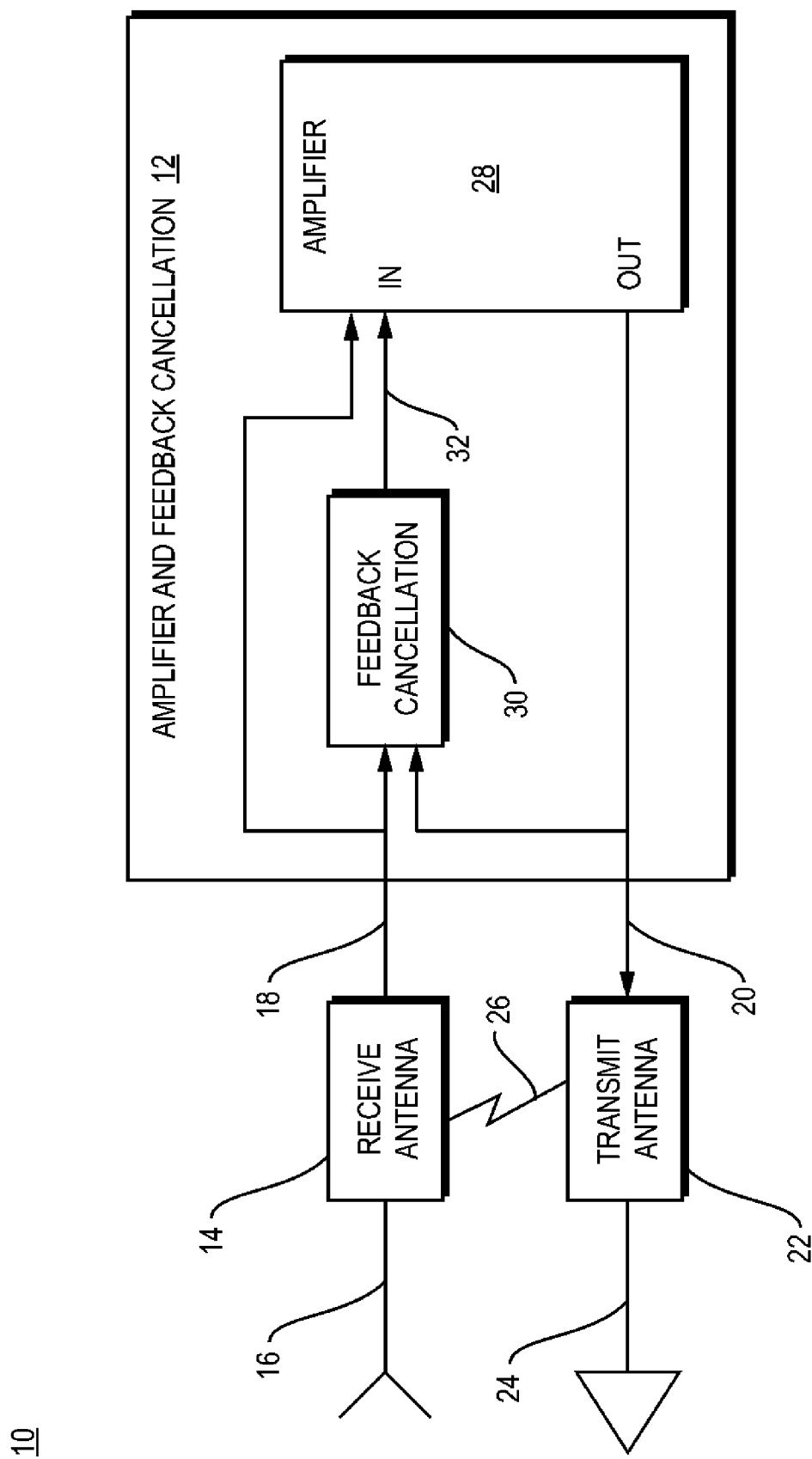
FIG. 1 is a block diagram illustrating the system according to the present invention on which may be implemented the hearing disclosed method.

The present invention is a feedback cancellation system and method in accordance with the teachings herein. In accordance with one embodiment of the present invention, the system 10, FIG. 1, discloses how a repeater or other a bidirectional amplifier 12 is coupled to a receiving antenna 14 for receiving and incoming signal, such as a cell phone signals from a cell phone tower or a hand held cell phone being used by a user, and for providing the received signal 18 to the repeater 12. Although the present invention will be explained with regard to cell phone signals, this is not a limitation of the present invention.

The purpose of repeater 12 is to amplify the received signal 18 and to provide an amplified signal 22 8 transmitting antenna 22 which then provides a transmitted signal 24 through the Airways to be received by the appropriate receiver. As previously mentioned, because of the spacing of the receiving antenna 14 proximate the transmitting antenna 22, antenna coupling showed schematically as 26 often occurs and if left unchecked, causes the amplifier to oscillate because of its attempted to amplify not only a receiving signal 18 but also a signal which includes the coupling signal 26 of the transmitting antenna 22.

In accordance with the teachings of the present invention, a system and method of the invention provide a feedback cancellation circuit 30 which, as will be explained in greater detail below, measures the incoming received signal 18 and the outgoing signal 20 and using one or more of the disclosed feedback cancellation techniques using time domain or frequency domain methods, provides a feedback cancellation signal 32 to the amplifier 28 in order to cancel, from the received signal 18, a signal equivalent to the coupling 26 that is occurring between the transmission antenna 22 and the receiving antenna 14.

Figure 2:
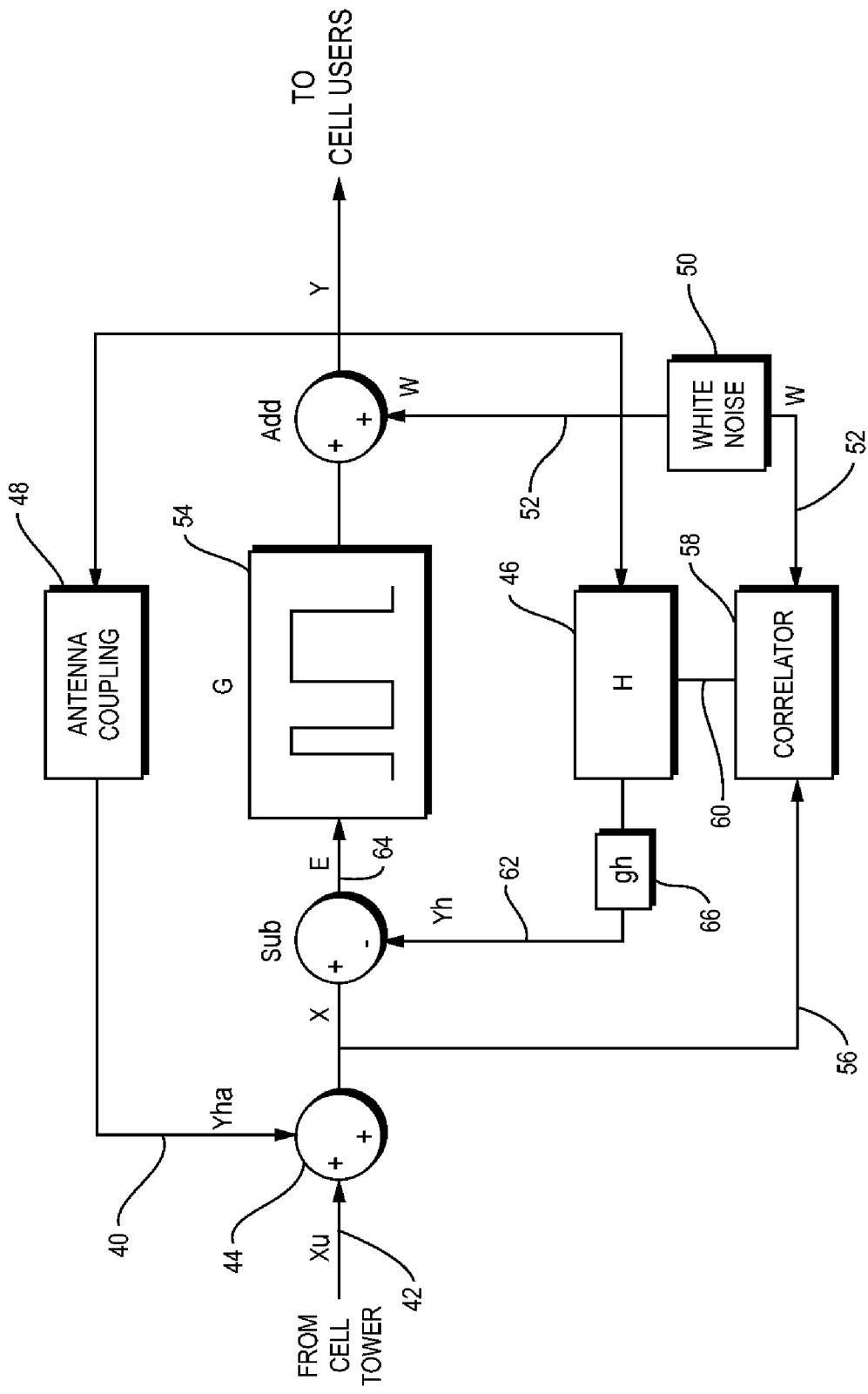
FIG. 2 is a more detailed block diagram showing one implementation of a time domain method of feedback cancellation in accordance with the system and method of the present invention.

The system and method according to the present invention will now be described in more detail beginning with regard to FIG. 2. In normal operation, when there is low antenna coupling between the receiving and transmitting antennas, Yha 40 is less than Xu 42, shown at the input 44 in the figure. An algorithm is used to converge the H filter 46 to be equal to the Antenna Coupling factor 48. The antenna coupling factor 48 represents the propagation path between the transmitter and receiver antennas. A difficulty arises when trying to converge the algorithm when the bandwidth of the Xu signal 42 is insufficient to properly stimulate the feedback. In other words the signal is highly periodic with respect to the overall bandwidth. To be certain that the Antenna coupling is properly stimulated, adding a band-limited white noise source 50 is an effective method. Thus, the algorithm is able to detect the Antenna coupling 48 path signal's characteristics, i.e. its equivalent FIR filter coefficients. As shown in FIG. 2, adding a white noise W signal 52 to the output of digital filter 54 of the BDA amplifier and correlating the input X 56 and the white noise W 52 using correlator 58, the output of correlator 58 shown at 60 is the estimated Antenna coupling FIR filter coefficients. The adaptive digital filter H's 46 output Yh 62 is negatively fed back to the input 64 of main digital band limit filter G 54 to cancel the coupling signal Yha 40.

The antenna coupling 48 can be characterized or described as an FIR filter with N tap coefficients. The Correlator 58 has M measurement taps such that Hcoeff(κ) κ=0 ... N−1.

The output of the Antenna coupling filter is Yha(t), such that:

$$Yha(t) = \sum_{k=0}^{k=N-1} Hcoeff(\kappa) \cdot Y(t-\kappa), t = 0, 1, 2, \ldots \quad (1)$$

When coupling exists, the input signal:

$$X(t)=Xu(t)+Yha(t) \quad (2)$$

The output of the H is Yh, and The input of the H filter is Y(t), t=0, 1, 2, ....

and as such $$Yh(t) = \sum_{k=0}^{k=N-1} Hcoeff(\kappa) \cdot Y(t-\kappa), t = 0, 1, 2, \ldots \quad (3)$$

wherein Y(t) is the G filtered user signal Xu(t) added with white noise W(t).

For G=1:

$$Y(t) = Xu(t) + W(t) \quad (4)$$

$$Yh(t) = \sum_{k=0}^{k=N-1} Hcoeff(\kappa) \cdot (Xu(t-\kappa) + W(t-\kappa)), t = 0, 1, 2, \ldots \quad (5)$$

$$\begin{bmatrix} Y(t) & Y(t-1) & Y(t-2) & \ldots & Y(t-N+1) \\ Y(t-1) & Y(t) & Y(t-1) & \ldots & Y(t-N+2) \\ Y(t+2) & Y(t+1) & Y(t) & \ldots & Y(t-N+3) \\ \ldots & \ldots & \ldots & \ldots & \ldots \\ Y(t+M-1) & Y(t+M-2) & Y(t+M-3) & \ldots & Y(t-N+M) \end{bmatrix}$$

$$\begin{bmatrix} Hcoeff(0) \\ Hcoeff(1) \\ Hcoeff(2) \\ \ldots \\ Hcoeff(N-1) \end{bmatrix} = \begin{bmatrix} Yh(t) \\ Yh(t+1) \\ Yh(t+2) \\ \ldots \\ Yh(t+M-1) \end{bmatrix}$$

Y·Hcoeff=Yh wherein Y is a M×N matrix, Hcoeff is a N×1 matrix, Yh is a M×1 matrix and W is a N×M matrix.

$$W = \quad (7)$$

$$\begin{bmatrix} W(t) & W(t+1) & W(t+2) & \ldots & W(t+M-1) \\ W(t-1) & W(t) & W(t+1) & \ldots & W(t+M-2) \\ W(t-2) & W(t-1) & W(t) & \ldots & W(t+M-3) \\ \ldots & \ldots & \ldots & \ldots & \ldots \\ W(t-N+1) & W(t-N+2) & W(t-N+3) & \ldots & W(t-N+M) \end{bmatrix}$$

$$W \cdot Y \cdot Hcoeff = W \cdot Yh \quad (8)$$

wherein W·Y is a N×N matrix, when M is a relatively large number, W·Y is a diagonal symmetrical N×N matrix, and all the diagonal elements have same dominant value Sw: the auto correlation of W(t), which yields $$Sw = \sum_{t=0}^{t=M-1} w^2(t) \quad (9)$$

such that all the non-diagonal elements of 0038 are less than 0.05 Sw, because of the orthogonal character of white noise.

$$W \cdot Y \approx \begin{bmatrix} Sw & 0 & 0 & \ldots & 0 \\ 0 & Sw & 0 & \ldots & 0 \\ 0 & 0 & Sw & \ldots & 0 \\ \ldots & \ldots & \ldots & \ldots & \ldots \\ 0 & 0 & 0 & \ldots & 0 \end{bmatrix}. \quad (10)$$

$$Hcoeff(k) \approx \frac{1}{Sw} \sum_{m=0}^{m=M-1} Yh(t+m)W(t+m-k)K = 0, \quad (11)$$

$$1, 2, \ldots N-1$$

Because Xu(t) is a periodic signal and is not correlated with given white noise W(t), $$\sum_{m=0}^{m=M-1} Xu(t+m) \cdot W(t+m-k) << \sum_{m=0}^{m=M-1} Yh(t+m) \cdot W(t+m-k) \quad (12)$$

$$Hcoeff(k) \approx \frac{1}{Sw} \sum_{m=0}^{m=M-1} (Yh(t+m) + Xu(t+m)) \cdot W(t+m-k) K = 0, \quad (13)$$

$$1, 2, \ldots N-1.$$

$$Hcoeff(k) \approx \frac{1}{Sw} \sum_{m=0}^{m=M-1} X(t+m)W(t+m-k) K = 0, 1, 2, \ldots N-1. \quad (14)$$

Equation (14) shows that adaptive filter coefficients Hcoeff (k) are the output of correlation unit 58.

From equations (8) and (12), we see that:

$$\sum_{m=0}^{m=M-1} Xu(t+m) \cdot W(t+m-k) \quad (15)$$

$$<< \sum_{k=0}^{k=N-1} Hcoeff(\kappa) \cdot \sum_{m=0}^{m=M-1} W^2(t+m-\kappa)$$

The value of M is therefore determined by equation (15). When W(t) is doubled, M can be half to satisfy the conditions in Equation (15). If the input user signal is strong, it will take a longer time to detect the Hcoeff(k), and M must be consequently larger. M depends on the Xu(t) power level.

The Hcoeff(k) detection time is shorter when the white noise power is higher and vice versa. It is necessary to select the level of added noise power considering the air coupling dynamics between the antennas and/or the allowed H filter update time. White noise can be added in a higher-powered pulse mode or in a low-power continuous mode. In addition, the level of the noise generator may be set to have a small effect on the output noise.

Feedback cancellation is realized by subtracting the output of the H filter 46 Yh signal 62 from the input signal X 56 as shown by the equation below:

$$E(t)=X(t)-Yh(t) \quad (16)$$

The H filter's 46 coefficients are updated every M clock cycle. The gain gh, 66, is set for the best feedback cancellation. When gh is zero, the correlation of E and W is equal to the correlation of X and W. gh can be increased such that the gh value reaches the optimum value when the output value of correlation between E and W is very small or close to zero as shown next wherein:

$$\sum_{m=0}^{m=M-1} E(t+m) \cdot W(t+m-k) << \sum_{m=0}^{m=M-1} Xu(t+m) \cdot W(t+m-k) \quad (17)$$

When gh is further increased, the correlation of E and W turns to opposite signs, which means:

$$\sum_{m=0}^{m=M-1} E(t+m) \cdot W(t+m-k) \approx -\sum_{m=0}^{m=M-1} Xu(t+m) \cdot W(t+m-k) \quad (18)$$

Equation (18) shows the over compensated situation when gh is too high. The gh value is tuned by the correlation of E and W to get the best feedback cancellation.

In order to test the present system and method, a test setup similar to FIG. 2 was established and an adjustable attenuator and phase shifter/line stretcher were located between the input and output antenna to simulate the air feedback path between the two antenna. In the BDA under test, the H filter is implemented on the down link. A first switch was provided to turn on or off the feedback cancellation while a second switch was provided to turn on or off the white noise. A first antenna is facing the PCS signal from the cell tower, while a second antenna is facing the user handset, and the down link gain is set at 80 dB. A coefficient detector detects the over-the-air path filter coefficients. When the phase shifter is tuned and the attenuation is decreased, the signal starts to distort and the noise floor starts to rise. When the first switch is closed, the feedback cancellation is enabled and the signal gets cleaner and the noise floor decreases. When the phase shifter is changed further, the down link will start to oscillate and it will stop oscillating as soon as the new H filter value is updated. When the attenuator is further decreased, the down link will oscillate again. At a point, the H filter will be incapable of canceling strong over-the-air feedback. In this case, the attenuator value is 5 dB (or more) lower than the value with no H filter.

TABLE 1

| White noise power (dBm) | Correlation time (second) |
|---|---|
| −40 | 335 |
| −34 | 83 |
| −28 | 20 |
| −22 | 5 |

Figure 3:
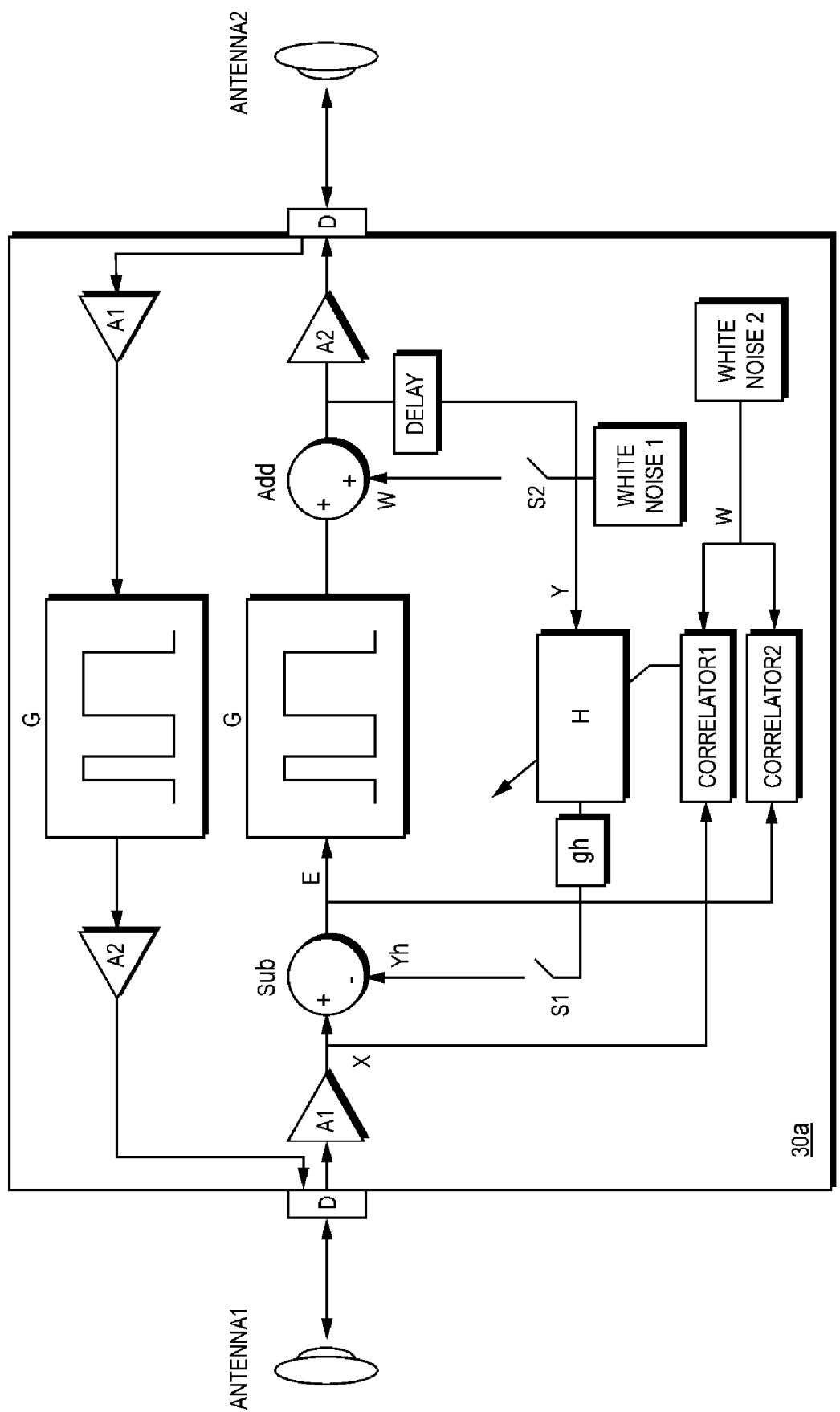
FIG. 3 is a more detailed block diagram showing a different variation on one implementation of a time domain method of feedback cancellation in accordance with the present invention.
Figure 4:
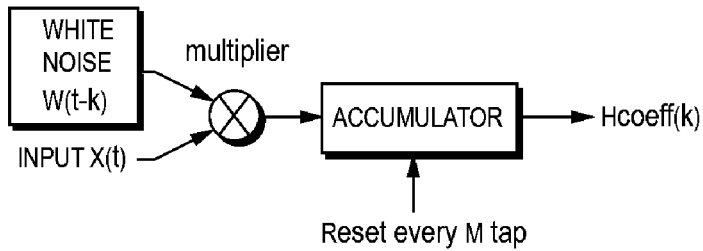
FIG. 4 is a block diagram of one implementation of a correlator according to the present invention.
Figure 5:
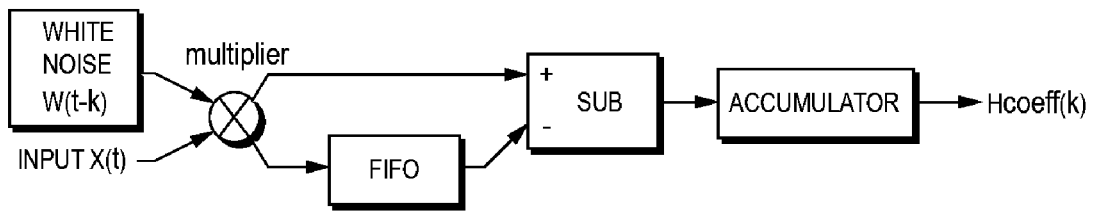
FIG. 5 is a block diagram of a second implementation of a correlator according to the present invention.
Figure 6:
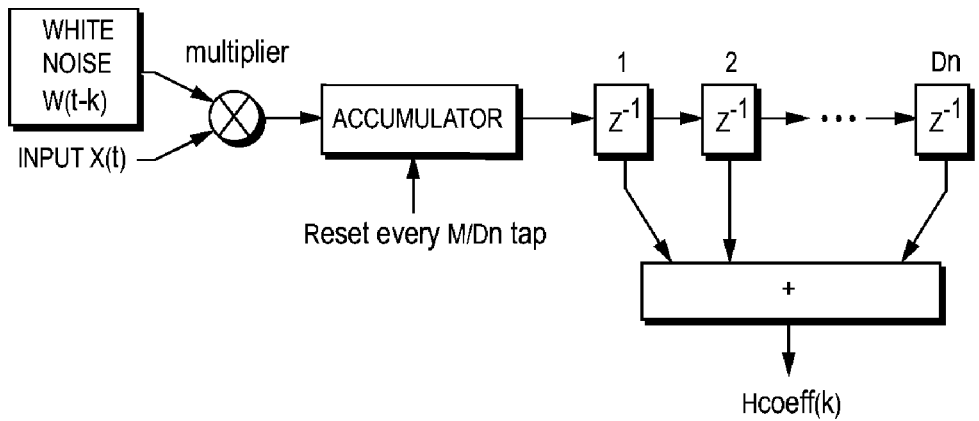
FIG. 6 is a block diagram of a third implementation of a correlator according to the present invention.

Table 1 shows the correlation time needed in a test In another embodiment shown in FIG. 3, the feedback cancellation device 30a and method in accordance with the teachings of the present invention is implemented in a slightly different manner wherein G are band pass filters; H is an N tap adaptive filter, whose coefficients are updated by correlator 1; and white noise 2 is a logic implementation of delay logic when a delayed white noise is needed for the correlator. Y is output of G plus White noise generator 1; D are directional couplers; A1 and A2 are analog amplifiers; DELAY is a delay which delays the Y signal to match the delay of two antennas; Sub is a digital subtractor wherein X subtracts Yh, the output of which is E; Add is a digital adder that adds the output of the G filter and white noise 1 W; gh is a gain block wherein the gain of gh is decided on to achieve the optimum cancellation; S1 and S2 are switches for turning off the H filter and white noise generators.

The White noise 1 and White noise 2 output band limit delay white noise W 50 which can be implemented as following:

Band limit white noise-random number generator.

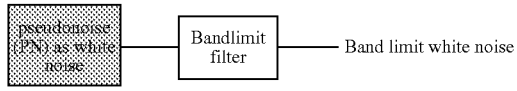

Correlator 58, is used to correlate two time varying signals X(t) and W(t) according to equation:

$$Hcoeff(k) \approx \frac{1}{Sw} \sum_{m=0}^{m=M-1} X(t+m) \cdot W(t+m-k) K = 0, \quad (20)$$

$$1, 2, \ldots N-1.$$

There are several ways to implement a correlator. Instead of a traditional correlator, three logic saving versions are shown in figure is 4, 5 and 6.

Figure 7:
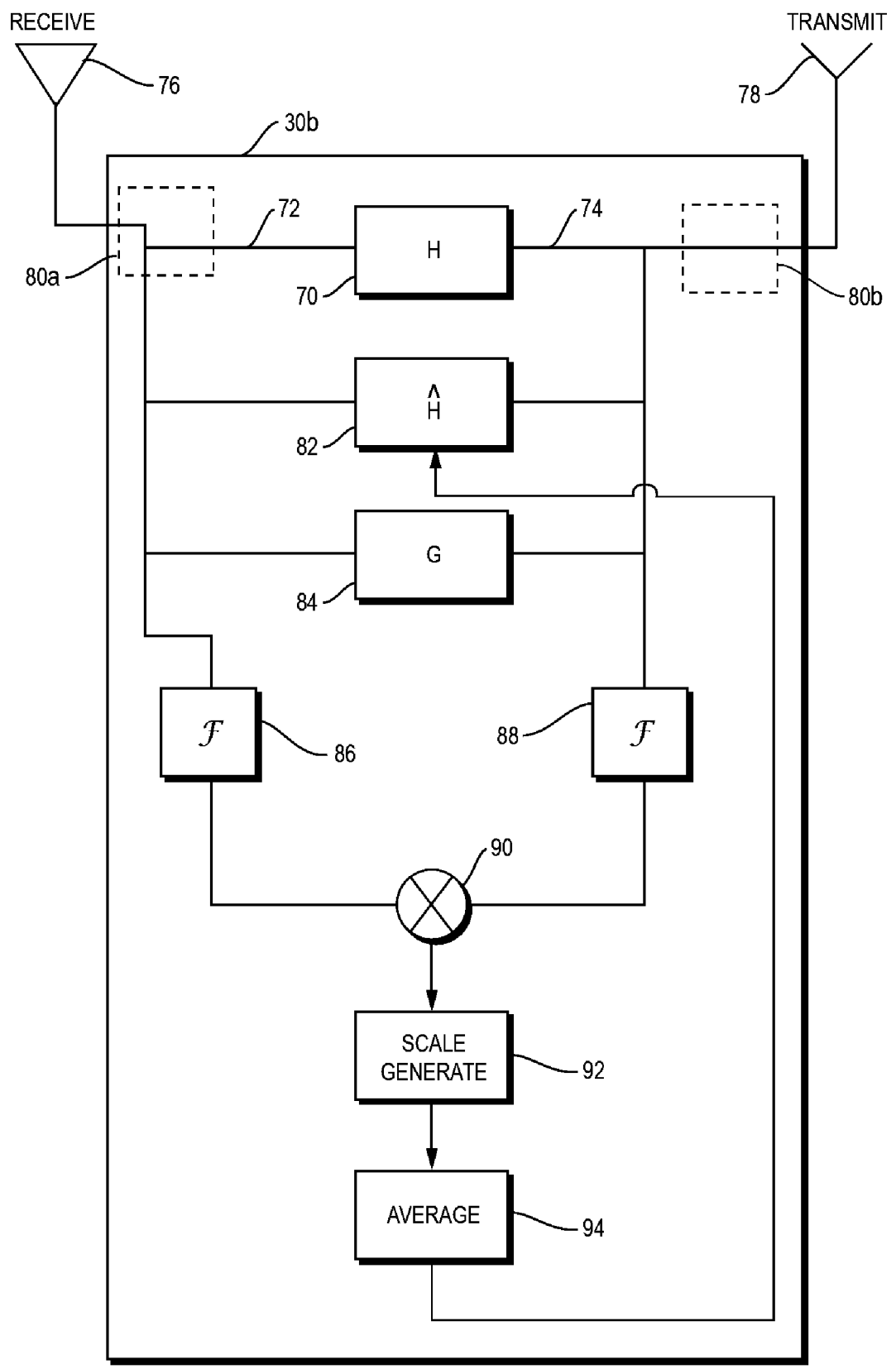
FIG. 7 is a block diagram of another implementation of the present invention using a frequency domain feedback cancellation system and method.

In another implementation of the present invention, the system and method disclosed herein utilizes a frequency domain system and method to provide appropriate feedback cancellation. The feedback cancellation system 30b, FIG. 7, includes a propagation filter 70 which couples the signals 72, 74 between the receive antenna 76 and the transmit antenna 78. Both the receive and transmit antennas 76, 78 respectively may be coupled to an optional frequency conversion and analog-to-digital conversion circuits 80 is a construction that is well known to those skilled in the art.

A second variable filter 82 provides an estimate of the signal required to cancel the feedback between the transmit and receive antennas. Also included in the feedback cancellation circuit is a main filter 84 which is used by the bidirectional amplifier to filter signals into appropriate bands. One or more Fourier transform circuits 86, 88 may be provided, each of which typically provides an forward Fourier transform on the signals.

The signals from the input and output sides of the circuit are combined by a complex or real multiply circuit 90. The output from the multiply circuit 90 is provided to the scale generator 92 which scales the frequency domain coefficients to control the gain of the loop that converges and provide the feedback cancellation values in block 82. Lastly, an averaging circuit 94, which may be accomplished with a digital accumulator or by multi-order filtering may be utilized to change the response time and rejection of fluctuations in the filters 70 that are tracked by filter 82. These fluctuations may be, for example, caused by off-air signals present in particular frequency bins of the Fourier Transform, and which cause unwanted changes that might otherwise cause changes in block 82 filter coefficient changes.

In general, the highest gain and the shortest convergence time is preferred, up to a point where stability is jeopardized due to additional delays. The averaging circuit 94 filters each of the coefficients calculated in the scale generates circuit 92 which are values that vary by a scale factor as described below. Other scale calculations are possible. For example, a scale calculation with a threshold or limit that sets and the upper or lower the value of scale. The averaging circuit takes the result of scaling and determines an estimate of the H coefficients. The coefficients in filter 84 are then an approximation of the H filter 70 response, thus providing cancellation of the feedback.

Figure 8:
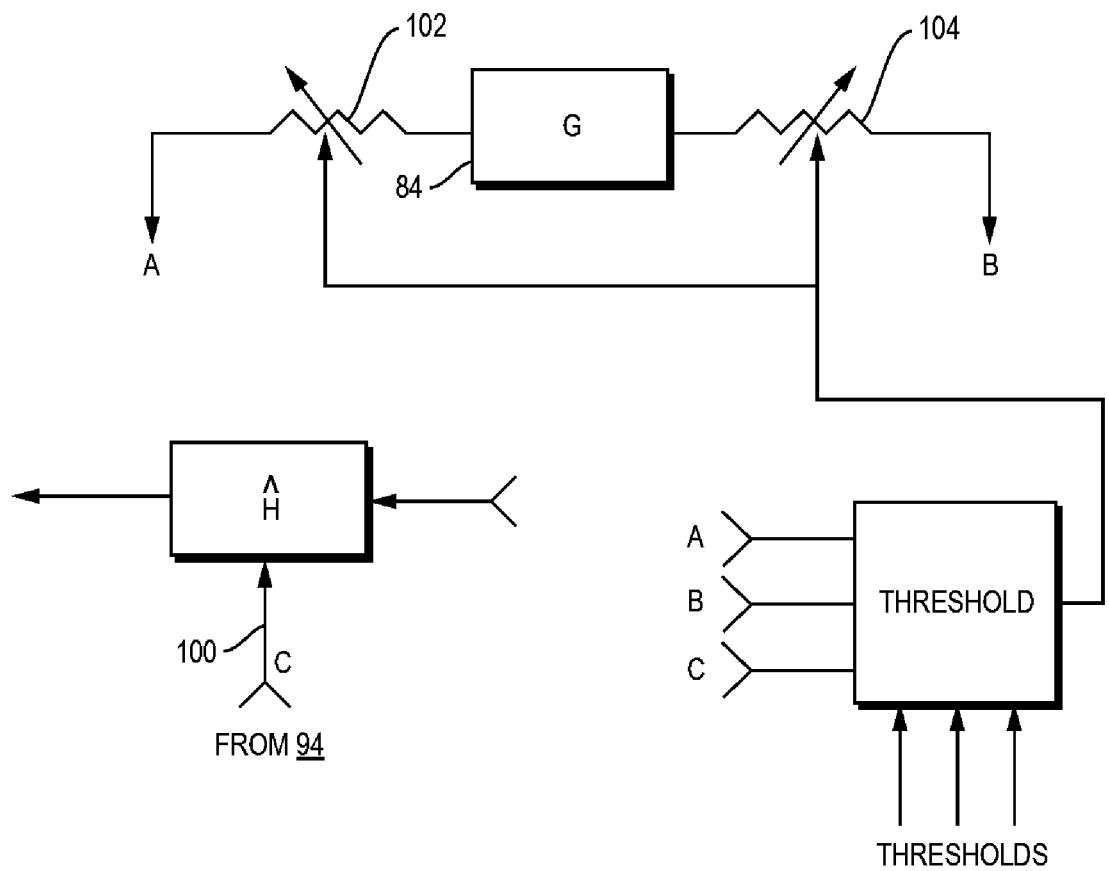
FIG. 8 is a block diagram of an implementation of the system and method of FIG. 7 incorporating additional features including threshold gain control.

The system and method described above may be used to cancel feedback in a bidirectional amplifier, such as a signal repeater. However, in certain situations, it may be possible for the system to break into oscillation. Some of the situations which cause or may cause oscillations are too rapid of a change in external propagation, internal fast changes in gain do, for example, to intermittent connections or cable an external signals applied. In this situation, it is desirable to have additional protection. This is provided in the form of a fast detector which evaluates the filter 80 to coefficients and signals the possibility of an overload. If this occurs, then a gain or attenuator block in series with the G. filter 84 is reduced. As shown in FIG. 8, if the value of the coefficient 100 from the averaging circuit 94, or peak or signal level of the importer output signals a or B. or any of the signals alone or in combination exceed a threshold, then the attenuators 102, 104 are switched to a higher value to stop potential or actual oscillation.

As previously described in connection with the time domain implementation of a feedback cancellation circuit described above, the present implementation utilizing a frequency domain and feedback methodology may also include a noise generator inserted in series with the main filter 84 which may add new ways to produce faster filter convergence. The noise may be steady or pulsed so that the noise does not degrade the signal. For example, a noise signal resulting in an approximately 1 dB increase in the nominal noise at a low duty cycle may be appropriate. For exemplary purposes, 83 DB noise pulse for one millisecond, added every 10 ms may be sufficient.

In addition, one or more correlators 58 as shown and described in connection with FIGS. 2 and 3 may be utilized with or without the addition of white noise. Moreover, yet an additional added feature may include a startup gain controlled scale generator 92 which produces a time varying scale value to help control oscillation in narrowband with signals during the initial training and startup of the system.

The present invention is and may be implemented in a combination of computer hardware and/or computer software as will be evident and well known to those skilled in the art.

The present invention is not intended to be limited to a device or method which must satisfy one or more of any stated or implied objects or features of the invention and is not intended to be limited to the preferred, exemplary, or primary embodiment(s) described herein. Modifications and substitutions by one of ordinary skill in the art are considered to be within the scope of the present invention, which is not to be limited except by the allowed claims and their legal equivalents.

The invention claimed is:

1. A system for detecting antenna coupling and for providing feedback cancellation to reduce or eliminate antenna coupling, the system comprising:
   a signal receiver, configured to be coupled to a signal receiving antenna, for receiving signals;
   a signal amplifier, coupled to a signal feedback cancellation circuit and to said signal receiver, and responsive to said received signals and to a feedback cancellation signal, for amplifying said received signals;

a signal transmitter, configured to be coupled to a signal transmitting antenna, for transmitting amplified signals from said signal amplifier; and the signal feedback cancellation circuit, configured to be coupled between said signal receiver and said signal transmitter, and responsive to said received signals and said amplified signals, for detecting signal coupling being between said receiving antenna and said transmitting antenna, wherein said signal feedback cancellation circuit includes a time domain feedback cancellation circuit, wherein said time domain feedback cancellation circuit further includes a white noise generator generating a white noise signal, said time domain feedback cancellation circuit coupled to said signal feedback cancellation circuit and configured for cross-correlating the white noise signal to the received signal, for developing the coefficients of the feedback cancellation circuit, and for causing said signal feedback cancellation circuit to adjust for antenna coupling between said signal receiver and said signal transmitter, and responsive to said coupling, for providing a feedback cancellation signal to said signal amplifier having a signal magnitude and strength for canceling said antenna signal coupling.

2. The system of claim 1, wherein said received signals include communication signals.

3. The system of claim 2, wherein said communication signals include cell phone telecommunications signals.

4. The system of claim 3, wherein said communication signals include TCP/IP signals.

5. The system of claim 1, wherein said signal feedback cancellation circuit includes a frequency domain feedback cancellation circuit.

6. The system of claim 1, wherein the white noise signal is not modulated and includes a band of frequencies that is not less than a passband width of the signal amplifier.

* * * * *